(12) United States Patent
Hintzer et al.

(10) Patent No.: US 9,688,796 B2
(45) Date of Patent: Jun. 27, 2017

(54) HIGH MELTING PTFE POLYMERS FOR MELT-PROCESSING

(71) Applicant: 3M INNOVATIVE PROPERTIES COMPANY, St. Paul, MN (US)

(72) Inventors: Klaus Hintzer, Kastl (DE); Harald Kaspar, Burgkirchen (DE); Ludwig Mayer, Burgkirchen (DE); Tilman C. Zipplies, Burghausen (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 14/918,245

(22) Filed: Oct. 20, 2015

(65) Prior Publication Data

US 2016/0039959 A1 Feb. 11, 2016

Related U.S. Application Data

(62) Division of application No. 13/811,783, filed as application No. PCT/US2011/044200 on Jul. 15, 2011, now Pat. No. 9,175,113.

(30) Foreign Application Priority Data

Jul. 23, 2010 (EP) .................................. 10170669

(51) Int. Cl.
*C08F 16/24* (2006.01)
*C08F 214/26* (2006.01)
*C09D 127/18* (2006.01)

(52) U.S. Cl.
CPC .......... *C08F 214/262* (2013.01); *C08F 16/24* (2013.01); *C09D 127/18* (2013.01)

(58) Field of Classification Search
USPC ................................................ 526/247, 242
See application file for complete search history.

(56) References Cited

U.S. PATENT DOCUMENTS

| 4,381,387 A * | 4/1983 | Sulzbach | ............... C08F 210/02 |
| | | | 428/421 |
| 4,522,995 A | 6/1985 | Anderson et al. | |
| 6,774,196 B1 | 8/2004 | Taira et al. | |
| 7,560,517 B2 * | 7/2009 | Hintzer | ............... C08F 214/186 |
| | | | 524/544 |
| 9,175,113 B2 * | 11/2015 | Hintzer | ............... C08F 214/262 |
| 2003/0004291 A1 | 1/2003 | Kaulbach et al. | |
| 2004/0024155 A1 | 2/2004 | Hintzer et al. | |
| 2007/0106010 A1 * | 5/2007 | Hedhli | ..................... C08F 14/18 |
| | | | 524/544 |
| 2007/0208137 A1 * | 9/2007 | Kaspar | ..................... C08L 27/16 |
| | | | 525/199 |
| 2010/0121012 A1 * | 5/2010 | Hintzer | ................. C08F 214/18 |
| | | | 526/247 |
| 2011/0040021 A1 * | 2/2011 | Kaspar | ................ B29C 47/0004 |
| | | | 524/520 |
| 2012/0129982 A1 * | 5/2012 | Zipplies | .................. C08F 14/18 |
| | | | 524/58 |
| 2013/0172477 A1 * | 7/2013 | Hintzer | ............... C08F 214/262 |
| | | | 524/544 |

FOREIGN PATENT DOCUMENTS

| EP | 1621559 A2 | 2/2006 |
| JP | 02-138396 A | 5/1990 |
| JP | 2003-311764 A1 | 11/2003 |
| WO | WO 2006/069900 A2 | 8/2004 |

* cited by examiner

*Primary Examiner* — Mark Kaucher
*Assistant Examiner* — Henry Hu
(74) *Attorney, Agent, or Firm* — C. Michael Geise

(57) ABSTRACT

Provided are a tetrafluoroethylene copolymers having a melting point of at least 317° C., a melt flow index (MFI) at 372° C. and a 5 kg load (MFI 372/5) of from about 0.60 g/10 min up to about 15 g/10 min. Also provided are methods of forming a shaped article using the copolymers described above, shaped articles made with those copolymers and compositions containing such copolymers.

8 Claims, No Drawings

HIGH MELTING PTFE POLYMERS FOR MELT-PROCESSING

FIELD

The present disclosure relates to tetrafluoroethylene copolymers, in particular melt processable tetrafluoroethylene copolymers with sufficient mechanical properties to make shaped articles, methods of making shaped articles and methods of melt-processing tetrafluoroethylene copolymers.

BACKGROUND

Polytetrafluoroethylenes (PTFE's, also often referred to as polytetrafluoroethylenes) have found wide application due to their high chemical inertness, low friction properties, non-stick properties, high melting points and thus high service temperatures and thermal stability. These properties have made PTFE's a well known material and the material of choice for making protective coatings, sealing materials like valves, washers and O-rings, implants, insulators, membranes, films, gaskets for use in household applications, architecture, and medical, chemical, aircraft and automotive industry.

According to international industry standards tetrafluoroethylene (TFE) homopolymers and copolymers with up to 1% by weight of other perfluorinated monomers can be called PTFE (see, for example, DIN EN ISO 12086-1). Furthermore, the polymers must have melting point within the range of 327+/−10° C. to qualify as PTFE.

To make shaped articles from PTFE, the polymers need to have sufficient mechanical properties, such as a tensile strength of at least 10 MPa and an elongation at break of at least 20%. Otherwise, the materials are too brittle to be shaped into articles. To have such mechanical properties the PTFE polymers must have a sufficiently high molecular weight, typically about $10^6$ g/mole or greater. However, PTFE polymers at such high molecular weight also have a very high melt viscosity (about $10^{10}$-$10^{13}$ Pa·s at 380° C.). This results in PTFE having a melt flow index (MFI) of less than 0.1 g/10 min at 372° C. using a 5 kg load (MFI 372/5 of 0 g/10 min).

The MFI measures the amount of polymer that can be pushed through a die at a specified temperature (here 372° C.) using a specified weight (here 5 kg). Thus, the MFI is a measure for the suitability for melt-processing of a polymer. Fluoropolymers with an MFI (372/5) of less than 0.1 g/10 min are considered not melt-processable. They cannot be processed from the melt by ordinary melt-processing techniques like, for example, melt extrusion or injection molding to make shaped articles.

Therefore, to make shaped articles from PTFE special processing techniques have to be used, like ram extrusion or cold compression molding and sintering. Typically, PTFE's are processed by preparing blocks, which are then sintered to fuse the polymer particles. The sintered billets are then skived or machined into shaped articles. These techniques may lead to inhomogeneous products containing cavities as a result of imperfect fusion of the PTFE particles during sintering. Furthermore, machining and skiving methods are economically inefficient because they produce considerable amounts PTFE waste.

Therefore, attempts have been made to prepare fluoropolymers that are melt processable.

One attempt is the production of low molecular weight polytetrafluoroethylene, so-called "PTFE micropowders". PTFE micropowders have a high melting point like high molecular PTFEs but have a much lower melt viscosity (typically far below $10^5$ Pa·s. at 382° C.). They have an MFI (372/5) of greater 0.1 g/10 mins and theoretically could be processed from the melt. However, PTFE micropowders are brittle and do not have mechanical properties suitable for making shaped articles. Micropowder material formed by melt processing breaks upon cooling or cannot be released from the mold without breaking PTFE micropowders thus do not have any mechanical properties suitable for making shaped PTFE articles. Therefore, PTFE micropowders are used as solid lubricants or as additives to impart low friction or low energy surface properties to other polymers. PTFE micropowders are commercially available under the trade designation "Dyneon TF 9201" or "Dyneon TF 9207" from Dyneon LLC, Oakdale, Minn., USA or under the trade designation Zonyl (e.g. Zonyl 1000, Zonyl 1100, Zonyl 1200, Zonyl 1400, and Zonyl 1500) from DuPont de Nemours, Wilmington, Del., US.

Another attempt of providing melt-processable fluoropolymers involves copolymerising comparatively high amounts of perfluoro alkyl vinyl ethers (PAVE's) with TFE. Typical amounts of copolymers range from 1 to 5 mol % (which corresponds to 1.7% to 8.4% wt % in case of perfluoro methyl vinyl ether (PMVE)—the smallest of the perfluoro alkyl vinyl ethers). These types of fluoropolymers are referred to in the art as "PFA's". PFA's have a molecular weight of 1 to $5\times10^5$ g/mol and a melting point between 300 and 315° C. (compare Modern Fluoropolymers, John Schiers, Wiley& Sons New York, 1998, pp 223 to 232). PFA's are melt-processable with sufficient mechanical properties to make shaped articles. However, due to their lower melting point they have a lower service temperature and thermal stability than PTFE's.

In U.S. Pat. No. 6,531,559 and U.S. Pat. No. 7,160,623 to Smith et al. another attempt to provide melt-processable PTFE's which melting points greater than 320° C. has been described. According to these documents such polymers may be prepared by blending various PTFE grades of different molecular weight and MFI's. While some of those blends are reported to be melt-proccessable and are reported to be releasable from molds without breaking these materials tend to be inhomogeneous and may thus be disadvantageous. U.S. Pat. Nos. 6,531,559 and 7,160,623 also appear to suggest making a TFE-comonomer with hexafluoropropene (HFP) or a perfluoro alkyl vinyl ether (PAVE) in amounts of less than 3 or less than 0.5 mole % for producing a melt-processable PTFE. However, while these documents provide examples for PTFE blends they do not provide any description of how such melt-processable copolymers can be prepared nor do they provide any examples of such copolymers. Indeed, when using HFP or a PAVE as comonomers with TFE in amounts as low as 1.0% wt. the resulting polymers with melting points greater than 315° C. were found to be so brittle that mechanical properties like tensile strength or elongation at break could not even be measured (see comparative examples herein below). Therefore, such copolymers could not be used to make shaped articles

SUMMARY

There is a need to provide tetrafluoroethylene polymers that have a melting point of at least 317° C., preferably at least 319° C. and more preferably at least 321° C. but that are melt-processable, i.e. that have a melt flow index at 372° C. and a 5 kg load (MFI (372/5)) of greater than 0.1 g/10 min. Desirably, such polymers are suitable for melt-processing such as melt extrusion and thus have an MFI(372/5) of at least 0.60 g/10 min. Such polymers are required to have sufficient mechanical properties for making shaped articles, such as an elongation at break of at least 20% and a tensile strength of at least 10 MPa. It has now been found that such polymers can be prepared when specific alkoxy or polyoxyalkyl substituted perfluorinated vinyl or allyl ether are used as comonomers in specific amounts to give tetrafluoroethylene copolymers of a specific MFI (372/5) range. Therefore, in the following there are provided tetrafluoroethylene copolymers comprising repeating units derived from tetrafluoroethylene (TFE) and having a melting point of at least 317° C., a melt flow index (MFI) at 372° C. and a 5 kg load (MFI 372/5) of from about 0.60 g/10 min up to about 15 g/10 min, and comprising from 0.12 to 1.40% by weight based on the weight of the copolymer of units derived from one or more perfluorinated comonomers and wherein the perfluorinated comonomers comprise one or more perfluorinated alkyl vinyl or alkyl allyl ether wherein the alkyl group of vinyl or allyl ether is interrupted by at least one oxygen atom.

In another aspect there is provided a method of making a shaped article comprising:

providing a composition comprising a copolymer as described above and subjecting the composition to melt-processing selected from melt extrusion, melt spinning, injection molding and melt blowing.

In a further aspect there is provided a shaped article comprising the polymer as described above.

In yet another aspect there is provided a composition comprising a polymer as described above wherein the composition is an aqueous dispersion.

In a further aspect there is provided a method of making tetrafluoroethylene copolymers that are melt-processable and have an elongation at break of at least 20% and a tensile strength at break of at least 10 MPa and a melting point of at least 317° C., or at least 319° C., or at least 321° C., and an MFI (375/5) of from about 1 to about 15 g/10 min comprising: polymerising TFE in an aqueous medium in the presence of an effective amount of a perfluorinated comonomer as described herein.

Advantageously, the copolymers provided herein may contain a sufficiently amount of comonomers to qualify as PTFE.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items. For example, a composition containing an ingredient A is meant to contain A or A and other ingredient. A composition consisting of A is meant to have ingredient A but no other ingredient. In both cases (limiting or non limiting meaning) equivalents are meant to be included.

The use of "a" or "an" is meant to encompass "one or more".

Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

The term "perfluorinated" as used herein refers to a compound whose hydrocarbons have been completely replaced by F atoms. For example, a —$CF_3$ residue is a perfluorinated methyl residue. A —$CHF_2$ residue for example would be a "partially fluorinated" compound, or more specifically a partially fluorinated methyl group. A perfluorinated compound may, however, in addition to C and F atoms also contain O atoms. Those O atoms are ether functionalities and are also referred to as "catenary oxygen atoms" as they are part of an alkyl chain and, more specifically, interrupting it. With respect to polymers the term "perfluorinated" is used to indicate that the polymers is made up by units derived from perfluorinated monomers. It is to be understood that perfluorinated polymers may still contain small amounts of hydrogens, typically in end groups which may be generated for example by chain interruptions or by degradation reactions of unstable endgroups generated in the polymerisation.

The present disclosure provides melt-processable tetrafluoroethylene polymers that have sufficient mechanical strength to be formed into shaped articles from the melt and that mechanical properties, such as elongation at break and/or tensile strength of samples generated from the melt can be determined.

The polytetrafluoroethylenes of the present disclosure are copolymers of TFE (i.e., comprising interpolymerized units of TFE and at least one additional perfluorinated monomer which is a perfluorinated vinyl or ally ether containing an alkyl group that is interrupted by at least one oxygen atom, as will be described in greater detail below and which will be referred to in the following as "the perfluorinated comonomer". The amount of perfluorinated comonomers used to prepare the polymers described herein should not exceed amounts of more than 1.4% wt, preferably less than 1.0% by weight, more preferably less than 0.9% by weight based on the weight of the copolymer. Accordingly, the total amount of the perfluorinated comonomer(s) may not exceed 0.95% or 0.75% by weight based on the total weight of the copolymer. The remainder of the copolymer are preferably units derived from TFE. In this case the polymers may qualify as PTFE's according to industry standards. However, it is also contemplated that in addition to TFE and the perfluorinated comonomers other comonomers may be used. For example, but not limited thereto, in some embodiments up to 30% of the units derived from TFE may be replaced by chlorotrifluoroethylene.

It is understood that more than one of the perfluorinated comonomers may be used, for example combinations thereof may be used. In such cases, the total amounts of the perfluorinated comonomers should not exceed those described above. However, the additional perfluorinated comonomers should not be present in amounts of less than 0.10 or less than 0.12 or less than 0.14% by weight or less than 0.20% by weight. If used in lower amounts polymers having mechanical properties described herein and also having a melting point of greater than 317° C., or greater than 319° C., or greater than 321° C. and that are also melt processable may not be obtained.

Suitable perfluorinated comonomers are perfluorinated compounds having one or at least one vinyl and/or allyl ether groups and a perfluorinated alkyl residue linked to the ether oxygen that is interrupted by at least one oxygen atom.

Examples of suitable comonomers include those corresponding to the general formulae $$CF_2=CF-(CF_2)_n-O-Rf \qquad (I),$$

or $$CF_2=CF-(CF_2)_n-O-Rf'-O-(CF_2)_m-CF=CF_2 \qquad (II).$$

In formula (I) n represents either 0 or 1. Rf represents a linear or branched, cyclic or acyclic perfluorinated alkyl residue containing at least one catenary oxygen atom. Rf may contain up to 8, preferably, or up to 6 carbon atoms, such as 1, 2, 3, 4, 5 and 6 carbon atoms. Typical examples of Rf include linear, branched alkyl residues interrupted by one oxygen atom, and linear or branched alkyl residues containing 2, 3, 4 or 5 ether oxygen atoms. Further examples of Rf include residues containing one or more of the following units and combinations thereof:
—$(CF_2O)$—, —$(CF_2CF_2-O)$—, $(-O-CF_2)$—, —$(O-CF_2CF_2)$—, —$CF(CF_3)$—, —$CF(CF_2CF_3)$—, —$O-CF(CF_3)$—, —$O-CF(CF_2CF_3)$—, —$CF(CF_3)-O$—, —$CF(CF_2CF_3)-O$—. Further examples of Rf include but are not limited to:
—$(CF_2)_{r1}-O-C_3F_7$,
—$(CF_2)_{r2}-O-C_2F_5$,
—$(CF_2)_{r3}-O-CF_3$,
—$(CF_2-O)_{s1}-C_3F_7$,
—$(CF_2-O)_{s2}-C_2F_5$,
—$(CF_2-O)_{s3}-CF_3$,
—$(CF_2CF_2-O)_{t1}-C_3F_7$,
—$(CF_2CF_2-O)_{t2}-C_2F_5$,
—$(CF_2CF_2-O)_{t3}-CF_3$,
wherein r1 and s1 represent 1, 2, 3, 4, or 5, r2 and s2 represent 1, 2, 3, 4, 5 or 6, r3 and s3 represent 1, 2, 3, 4, 5, 6 or 7; t1 represents 1 or 2; t2 and t3 represent 1, 2 or 3.

Specific examples of suitable perfluorinated comonomers include
$F_2C=CF-O-CF_2-O-(CF_2)-F$,
$F_2C=CF-O-CF_2-O-(CF_2)_2-F$,
$F_2C=CF-O-CF_2-O-(CF_2)_3-F$,
$F_2C=CF-O-CF_2-O-(CF_2)_4-F$,
$F_2C=CF-O-(CF_2)_2-OCF_3$,
$F_2C=CF-O-(CF_2)_3-OCF_3$,
$F_2C=CF-O-(CF_2)_4-OCF_3$,
$F_2C=CF-CF_2-O-(CF_2)_3-(OCF_2)_2-F$,
$F_2C=CF-CF_2-O-CF_2-(OCF_2)_3-CF_3$,
$F_2C=CF-CF_2-O-CF_2-(OCF_2)_4-CF_3$,
$F_2C=CF-CF_2-O-(CF_2O)_2-OCF_3$,
$F_2C=CF-CF_2-O-(CF_2O)_3-OCF_3$,
$F_2C=CF-CF_2-O-(CF_2O)_4-OCF_3$.

In formula (II) n and m represent, independently from each other, either 1 or 0. Rf' represents a linear, branched, cyclic or acyclic perfluorinated alkylene unit that may or may not contain one or more catenary oxygen atoms. Rf' may have up to 8, preferably up to 6 carbon atoms. Typical examples of Rf' include linear or branched alkylenes containing one or more —$(CF_2O)$— or —$(CF_2CF_2-O)$— units. Further examples for Rf' include but are not limited to
—$(CF_2)_u$—
—$(CF_2)_o-CF(CF_3)-(CF_2)_q$—
—$(CF_2)_o-CF(C_2F_5)-(CF_2)_q$—
wherein u represents 1, 2, 3, 4, 5, 6, 7 or 8; o represents 0, 1, 2, 3, 4, 5, 6, q represents 0, 1, 2, 3, 4, 5, 6 with the proviso that o+q is 6 or less.

Specific examples of suitable perfluorinated comonomers further include
$F_2C=CF-O-X-O-CF=CF_2$,
$F_2C=CF-O-X-O-CF_2-CF=CF_2$,
$F_2C=CF-CF_2-O-X-O-CF_2-CF=CF_2$, wherein X is $(CF_2)n$ and n is 1, 2, 3, 4, 5, 6, 7 or 8.

Perfluorinated comonomers as described above are either commercially available, for example from Anles Ltd. St. Peterburg, Russia or can be prepared according to methods described in EP 1 240 125 to Worm et al., or EP 0 130 052 to Uschold et al. or in Modern Fluoropolymers, J. Scheirs, Wiley 1997, p 376-378.

Copolymers, especially those with a vinyl functionality, having a residue Rf with only one catenary oxygen atom preferably have a comonomer content of at least 0.20% by weight based on the weight of the copolymer.

The tetrafluoroethylene copolymers provided herein have a melting point of at least 317° C. or at least 319° C. or at least 321° C. Typically, the polymers have a melting point between 321° C. and 329° C. When referred herein to a melting point the melting point of the once molten material is meant unless stated otherwise. Polymers with a very high content of TFE-units tend to have different melting points when being molten for the first time and after being molten for the first time, in which case the melting point tends to be somewhat lower. However, once the material has been molten the melting point remains constant. The determination of the melting point by DSC has been described, for example, in ASTM D 4591.

The tetrafluoroethylene copolymers provided herein have an MFI (372/5) of from about 0.6 g/10 min. up to about 15 g/10 min. Outside this range the polymers may be too brittle to have a measurable tensile strength and/or elongation. The determination of the MFI has been described, for example, in DIN EN ISO 1133.

In one embodiment of this disclosure the perfluorinated comonomer is a compound according to formula (I) wherein Rf has only one oxygen atom and n is 1 or 0. In this embodiment the copolymers have a content of perfluorinated comonomer of from about 0.20% by weight up to about 1.4% by weight or up to about 1.0% by weight or up to about 0.95% by weight. The copolymers of this embodiment may further have an MFI (372/5) of from about 0.60 to about 15 g/10 min, preferably from about 0.7 to about 6 g/10 min or from about 0.8 to 5 g/10 min and have a melting point of at least 319° C. or preferably at least 321° C.

In yet another embodiment the perfluorinated comonomer is a compound according to formula (I) wherein Rf has at least two catenary oxygen atoms, wherein n is 1 or 0 and is preferably 1. In this embodiment the copolymers have a content of perfluorinated comonomer of from about 0.10% by weight up to about 1.4% by weight or from about 0.14% by weight up to about 1.0% by weight or up to about 0.95% by weight. The tetrafluoroethylene copolymers of this embodiment further have an MFI (372/5) of from about 0.60 to about 15, preferably from about 1 to about 14 or to about 12 and have a melting point of at least 319° C. or preferably at least 321° C.

The tetrafluoroethylene copolymers described herein have mechanical properties sufficient to prepare shaped articles by melt processing. This means the copolymers have a tensile strength of at least 10 MPa or at least 20 MPa. The copolymers provided herein have an elongation at break of at least 20% or at least 100% or even at least 200%. The determination of elongation at break and tensile strength has been described, for example, in DIN EN ISO 527-1.

The tetrafluoroethylene copolymers described herein may be prepared by emulsion or suspension polymerisation. TFE is copolymerized in the presence of initiators and perfluorinated comonomers described above. Other ingredients may be added.

The perfluorinated comonomers are used in effective amounts to make polymer with the properties described herein. Effective amounts are at least those amounts of perfluorinated comonomers as described and exemplified above.

In a suspension polymerisation the reaction mixture coagulates and settles as soon as stirring of the reaction mixture is discontinued. Suspension polymerisations are carried out in the absence of emulsifiers. Usually vigorously stirring is required.

In aqueous emulsion polymerisations the polymerisation is carried out in a way that stable dispersions are obtained. The dispersions remain stable after stirring of the reaction mixture has stopped for at least 2 hours, or at least 12 hours or at least 24 hours. Typically, fluorinated emulsifiers are employed in the aqueous emulsion polymerisation. When used, a fluorinated emulsifier is typically used in an amount of 0.01% by weight to 1% by weight based on solids (polymer content) to be achieved. Gently stirring is required if the emulsion polymerisation is to be carried out with out emulsifiers.

Suitable emulsifiers include any fluorinated emulsifier commonly employed in aqueous emulsion polymerization. Particularly preferred emulsifiers are those that correspond to the general formula:

$$Y\text{—}R_f\text{—}Z\text{-}M \quad (III)$$

wherein Y represents hydrogen, Cl or F; $R_f$ represents a linear or branched perfluorinated alkylene having 4 to 10 carbon atoms; Z represents $COO^-$ or $SO_3^-$ and M represents a cation like an alkali metal ion, an ammonium ion or $H^+$. Exemplary emulsifiers include: ammonium salts of perfluorinated alkanoic acids, such as perfluorooctanoic acid and perfluorooctane sulphonic acid.

More preferable for use in the preparation of the polymers described herein are emulsifiers of the general formula:

$$[R_f\text{—}O\text{-}L\text{-}COO^-]_i X_i^+ \quad (IV)$$

wherein L represents a linear or branched partially or fully fluorinated alkylene group or an aliphatic hydrocarbon group, $R_f$ represents a linear or branched, partially or fully fluorinated aliphatic group or a linear or branched partially or fully fluorinated group interrupted with one or more oxygen atoms, $X_i^+$ represents a cation having the valence i and i is 1, 2 and 3. In case the emulsifier contains partially fluorinated aliphatic group it is referred to as a partially fluorinated emulsifier. Preferably, the molecular weight of the emulsifier is less than 1,000 g/mole.

Specific examples are described in, for example, US Pat. Publ. 2007/0015937 (Hintzer et al.). Exemplary emulsifiers include: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2(OCF(CF_3)CF_2)OCF(CF_3)COOH$, $CF_3(CF_2)_2(OCF_2CF_2)_4OCF(CF_3)COOH$, $CF_3CF_2O(CF_2CF_2O)_3CF_2COOH$, and their salts.

Other emulsifiers include fluorosurfactants that are not carboxylic acids, such as for example, sulfinates or perfluoroaliphatic sulfinates or sulfonates. The sulfinate may have a formula $Rf\text{—}SO_2M$, where Rf is a perfluoroalkyl group or a perfluoroalkoxy group. The sulfinate may also have the formula $Rf'\text{—}(SO_2M)_n$ where Rf' is a polyvalent, preferably divalent, perfluoro radical and n is an integer from 2-4, preferably 2. Preferably the perfluoro radical is a perfluoroalkylene radical. Generally Rf and Rf' have 1 to 20 carbon atoms, preferably 4 to 10 carbon atoms. M is a cation having a valence of 1 (e.g. H+, Na+, K+, $NH_4$+, etc.). Specific examples of such fluorosurfactants include, but are not limited to $C_4F_9\text{—}SO_2Na$; $C_6F_{13}\text{—}SO_2Na$; $C_8F_{17}\text{—}SO_2Na$; $C_6F_{12}\text{—}(SO_2Na)_2$; and $C_3F_7\text{—}O\text{—}CF_2CF_2\text{—}SO_2Na$.

In one embodiment, the molecular weight of the emulsifier, preferably a partially fluorinated emulsifier, more preferably a partially fluorinated emulsifier having at least one carboxylic acid functionality, is less than 1500, 1000, or even 500 grams/mole.

These emulsifiers may be used alone or in combination as a mixture of two or more of them. The amount of the emulsifier is well below the critical micelle concentration, generally within a range of from 250 to 5,000 ppm (parts per million), preferably 250 to 2000 ppm, more preferably 300 to 1000 ppm, based on the mass of water to be used. Within this range, the stability of the aqueous emulsion should be sufficient. In order to further improve the stability of the aqueous emulsion, it may be preferred to add one or more emulsifiers during or after the polymerization. The amount of emulsifier used my influence the shape of the polymer particles formed. Higher amounts of emulsifiers, in particular amounts above the cmc may lead to the generation of elongated particles like rod-shaped or ribbon-shaped particles. Lower amounts of emulsifiers may lead to spheroidal or spherical particles.

In one embodiment, the emulsifier is not added simultaneously (i.e., is added separately) with the fluorinated polyether to the reaction vessel.

In one embodiment, the emulsifier is added as a microemulsion with a fluorinated liquid, such as described in U.S. Publ. No. 2008/0015304 (Hintzer et al.), WO Publ. No. 2008/073251 (Hintzer et al.), and EP Pat. No. 1245596 (Kaulbach et al.). Microemulsions are transparent emulsions that are thermodynamically stable (stable for longer than 24 hours) and have droplet sizes from 10 nm to a maximum of 100 nm. Large quantities of fluorinated emulsifiers are used to prepare these microemulsions. In the cases where a mixture is used that is not a microemulsion, the particle sizes and amounts of the ingredients are such that the emulsion or mixture formed is not transparent, but is milky or opaque to the visible eye.

In one embodiment, the emulsifier is not added as a microemulsion with a fluorinated liquid. Typical fluorinated liquids include fluorinated or perfluorinated hydrocarbons or fluorinated or perfluorinated ether or polyether. The fluorinated polyether may be added in excess of the emulsifier. In one embodiment, the weight ratio of the fluorinated polyether to emulsifier is greater than 1:1, 1.5:1, 2:1, 2.5:1, 3:1, 5:1, or even 10:1.

Therefore, in one embodiment there is provided a tetrafluoroethylene copolymer as described herein in an aqueous dispersion, typically in an amount of 10 to 70% b weight (solid content) and in the presence of at least one emulsifier, preferably of the type as described in formula (IV).

The aqueous emulsion polymerization may be initiated with a free radical initiator or a redox-type initiator. Any of the known or suitable initiators for initiating an aqueous emulsion polymerization of TFE can be used. Suitable initiators include organic as well as inorganic initiators, although the latter are generally preferred. Exemplary organic initiators include: organic peroxide such as bissuccinic acid peroxide, bisglutaric acid peroxide, or tert-butyl hydroperoxide. Exemplary inorganic initiators include: ammonium-alkali- or earth alkali salts of persulfates, permanganic or manganic acids, with potassium permanganate preferred. A persulfate initiator, e.g. ammonium persulfate (APS), may be used on its own or may be used in combination with a reducing agent. Suitable reducing agents include bisulfites such as for example ammonium bisulfite or sodium metabisulfite, thiosulfates such as for example ammonium, potassium or sodium thiosulfate, hydrazines, azodicarboxylates and azodicarboxyldiamide (ADA). Further reducing agents that may be used include sodium formaldehyde sulfoxylate or fluoroalkyl sulfinates. The reducing agent typically reduces the half-life time of the persulfate initiator. Additionally, a metal salt catalyst such as for example copper, iron, or silver salts may be added.

The amount of the polymerization initiator may suitably be selected, but it is usually preferably from 2 to 600 ppm, based on the mass of water used in the polymerisation. The amount of the polymerization initiator can be used to adjust the MFI of the tetrafluoroethylene copolymers. If small amounts of initiator are used a low MFI will be obtained. The MFI can also, or additionally, be adjusted by using a chain transfer agent. Typical chain transfer agents include ethane, propane, butane, alcohols such as ethanol or methanol or ethers like but not limited to dimethyl ether, tert butyl ether, methyl tert butyl ether. The amount and the type of perfluorinated comomonomer influences the melting point of the resulting polymer.

The aqueous emulsion polymerization system may further comprise auxiliaries, such as buffers, and complex-formers. It is preferred to keep the amount of auxiliaries as low as possible to ensure a higher colloidal stability of the polymer latex. The aqueous emulsion polymerization may further comprise additional comonomers if desired. In one embodiment, the polymerization is initiated with TFE monomers and comonomers to form the tetrafluoroethylene compolymers.

In another embodiment, a seeded polymerization is used to produce the tetrafluoroethylene copolymers. If the composition of the seed particles is different from the polymers that are formed on the seed particles a core-shell polymer is formed. That is, the polymerization is initiated in the presence of small particles of fluoropolymer, typically small PTFE particles that have been homopolymerized with TFE or produced by copolymerizing TFE with one or more perfluorinated comonomers as described above. These seed particles typically have a Z-average diameter of between 50 and 100 nm or 50 and 150 nm (nanometers). Such seed particles may be produced, for example, in a separate aqueous emulsion polymerization. They may be used in an amount of 20 to 50% by weight based on the weight of water in the aqueous emulsion polymerization. Accordingly, the thus produced particles will comprise a core of a homopolymer of TFE or a copolymer of TFE and an outer shell comprising either a homopolymer of TFE, or a copolymer of TFE. The polymer may also have one or more intermediate shells if the polymer compositions are varied accordingly. The use of seed particles allows better control over the resulting particle size and the ability to vary the amount of TFE in the core or shell. Such polymerization of TFE using seed particles is described, for example, in U.S. Pat. No. 4,391,940 (Kuhls et al.) or WO03/059992 A1. In another embodiment, core shell particles may be used which comprise a core of a homopolymer of TFE or a copolymer of TFE, and at least one shell comprising either a homopolymer of TFE, or a copolymer of TFE, wherein the at least one outer shell has a molecular weight that is lower than that of the core. The core shell structure described above may further increase the resistance of the polymer to coagulation.

Again the polymer has the final composition regarding the nature and amounts of comonomers as described herein above.

The aqueous emulsion polymerization, whether done with or without seed particles, will preferably be conducted at a temperature of at least 10° C., 25° C., 50° C., 75° C., or even 100° C.; at most 70° C., 80° C., 90° C., 100° C., 110° C., 120° C., or even 150° C. The polymerization will preferably be conducted at a pressure of at least 0.5, 1.0, 1.5, 1.75, 2.0, or even 2.5 MPa (megaPascals); at most 2.25, 2.5, 3.0, 3.5, 3.75, 4.0, or even 4.5 MPa.

Usually the aqueous emulsion polymerization is carried out by mildly stirring the aqueous polymerization mixture. The stirring conditions are controlled so that the polymer particles formed in the aqueous dispersion will not coagulate. The aqueous emulsion of the present disclosure may be carried out in a vertical kettle (or autoclave) or in a horizontal kettle. Paddle or impeller agitators may be used.

The aqueous emulsion polymerization usually is carried out until the concentration of the polymer particles in the aqueous emulsion is at least 15, 20, 25, or even 30% by weight; at most 20, 30, 35, 40, or even 50% by weight (also referred to a solid content).

In the resulting dispersion, the average particle size of the polymer particles (i.e., primary particles) is at least 150, 200, or even 250 nm; at most 250, 275, 300, or even 350 nm (Z-average). The particle sizes of dispersions can be determined by inelastic light scattering.

The polymer dispersion can also be used to prepare dispersions with bimodal, and multimodal particle size distributions for example by mixing different dispersions. These distributions may have a wide distribution, such as, for example, particle sizes ranging from 20 nm to 1000 nm as disclosed in e.g. U.S. Pat. No. 5,576,381, EP 0 990 009 B1 and EP 969 055 A1. Multi-modal fluoropolymer particle dispersions may present advantageous properties in coatings, such as better adhesion to the substrate and denser film formation. For example, the fluoropolymer dispersions may comprise a mixture of first fluoropolymer particles having an average particle size (Z-average) of at least 180 nm in combination with second fluoropolymer particles that have an average particle size (Z-average particle diameter) of less than 180 nm, preferably an average particle size of not more than 0.9 or not more than 0.7 times the average particle size (Z-average) of the first fluoropolymer particles (as disclosed, for example, in U.S. Pat. No. 5,576,381). Bimodal or multi-modal fluoropolymer dispersions can be conveniently obtained by blending the aqueous fluoropolymer dispersion of different fluoropolymer particle sizes together in the desired amounts. The fluoropolymer population may not only be bimodal or multimodal with respect to the particle sizes but may also be bimodal or multimodal with respect to the fluoropolymers or the molecular weight of the fluoropolymers used. For example the first polymer having an average particle size of at least 180 nm may be a non-melt processable fluoropolymer and the second fluoropolymer having an average particles size that is not more than 0.9 or not more than 0.7 times the average particle size of the first polymer may be a non-melt processable or a melt-processable fluoropolymer. Similarly the first and/or second fluoropolymer may be a fluoroelastomer. In particular, dispersions of non-melt processable fluoropolymers may be mixed with aqueous dispersions of other fluoropolymers, in particular melt-processable fluoropolymers. Suitable dispersion of melt-processable fluoropolymers that can be mixed with the non-melt processable fluoropolymer dispersions include dispersions of the following fluoropolymers: copolymers of TFE and a perfluorinated vinyl ether (PFA) and copolymers of TFE and HFP (FEP). Such dispersions may be mono-modal, bi-modal or multimodal as disclosed in e.g. EP 990 009 A1.

After the conclusion of the polymerization reaction, the dispersions may be treated by anion exchange to remove the emulsifiers if desired. Methods of removing the emulsifiers from the dispersions by anion-exchange and addition of non-ionic emulsifiers are disclosed for example in EP 1 155 055 B1, by addition of polyelectrolytes are disclosed in WO2007/142888 or by addition of non-ionic stabilizers such as polyvinylalcohols, polyvinylesters and the like.

The fluoropolymer content in the dispersions may be increased by upconcentration, for example using ultrafiltration as described, for example in U.S. Pat. No. 4,369,266 or by thermal decantation (as described for example in U.S. Pat. No. 3,037,953) or by electrodecantation. The solid content of upconcentrated dispersions is typically about 50 to about 70% by weight.

Typically, dispersions subjected to a treatment of reducing the amount of fluorinated emulsifiers contain a reduced amount thereof, such as for example amounts of from about 1 to about 500 ppm (or 2 to 200 ppm) based on the total weight of the dispersion. Reducing the amount of fluorinated emulsifiers can be carried out for individual dispersion or for combined dispersion, e.g. bimodal or multimodal dispersions. Typically the dispersions are ion-exchanged dispersions, which means they have been subjected by an anion-exchange process to remove fluorinated emulsifiers or other compounds from the dispersions. Such dispersions typically contain trace amounts of trimethyl amine as a side product from the anion-exchange process. Typically, such dispersions contain from about 0.1 up to 50 ppm trimethylamine (based on the weight of the dispersion).

The dispersions may have a conductivity of at least 500 µS, typically between 500 µS and 5,000 µS or between 500 and 1,500 µS. The desired level of conductivity of the dispersion may be adjusted by adding a salt thereto such as for example a simple inorganic salt such as sodium chloride or ammonium chloride, sulfates, sulfonates, phosphates and the like. Also, the level of conductivity may be adjusted by adding an anionic non-fluorinated surfactant to the dispersion as disclosed in WO 03/020836. Adding cationic emulsifiers to the dispersions is also possible, as described for example in WO 2006/069101.

Typical anionic non-fluorinated surfactants that may be used include surfactants that have an acid group, in particular a sulfonic or carboxylic acid group. Examples of non-fluorinated anionic surfactants include surfactants that have one or more anionic groups. Anionic non-fluorinated surfactants may include in addition to one or more anionic groups, other hydrophilic groups such as polyoxyalkylene groups having 2 to 4 carbons in the oxyalkylene group (for example, polyoxy ethylene groups). Typical non-fluorinated surfactants include anionic hydrocarbon surfactants. The term "anionic hydrocarbon surfactants" as used herein comprises surfactants that include one or more hydrocarbon moieties in the molecule and one or more anionic groups, in particular acid groups such as sulfonic, sulfuric, phosphoric and carboxylic acid groups and salts thereof. Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched and may contain cyclic structures. The hydrocarbon moiety may also be aromatic or contain aromatic groups. Additionally, the hydrocarbon moiety may contain one or more hetero-atoms such as for example oxygen, nitrogen and sulfur.

Particular examples of non fluorinated, anionic hydrocarbon surfactants include alkyl sulfonates such as lauryl sulfonate, alkyl sulfates such as lauryl sulfate, alkylarylsulfonates and alkylarylsulfates, and alkylsulfosuccinates, fatty (carboxylic) acids and salts thereof such as lauric acids and salts thereof and phosphoric acid alkyl or alkylaryl esters and salts thereof. Commercially available anionic hydrocarbon surfactants that can be used include those available under the trade designation Polystep Al 6 (sodium dodecylbenzyl sulphonate) from Stepan Company, Germany; Hostapur SAS 30 (secondary alkyl sulphonate sodium salt), Emulsogen LS (sodium lauryl sulfate) and Emulsogen EPA 1954 (mixture of C2 to C4 sodium alkyl sulfates) each available from Clariant GmbH, Germany; Edenor C-12 (Lauric acid) available from Cognis, Germany; and TRI-TON X-200 (sodium alkylsulfonate) available from Dow Chemical, Midland, Mich. Further suitable anionic surfactants include the sulfosuccinates disclosed in EP 1538177 and EP 1526142.

Non-fluorinated non-ionic surfactants may also be present in the dispersion, for example as the result of ion-exchange process to remove the fluorinated emulsifier or as the result of upcontentration process where non-ionic emulsifiers may have been added to increase the stability of the dispersions. Examples of non-ionic surfactants can be selected from the group of alkylarylpolyethoxy alcohols (although not being preferred), polyoxyalkylene alkyl ether surfactants, and alkoxylated acetylenic diols, preferably ethoxylated acetylenic diols, and mixtures of such surfactants.

Typically, the non-ionic surfactant or non-ionic surfactant mixture used will have an HLB (hydrophilic lypophilic balance) between 11 and 16.

In particular embodiments, the non-ionic surfactant of mixture of non-ionic surfactants corresponds to the general formula:

$$R_1O-[CH_2CH_2O]_n-[R_2O]_m-R_3 \qquad (V)$$

wherein $R_1$ represents a linear or branched aliphatic or aromatic hydrocarbon group having at least 8 carbon atoms, preferably 8 to 18 carbon atoms. In a preferred embodiment, the residue R1 corresponds to a residue (R')(R")C— wherein R' and R" are the same or different, linear, branched or cyclic alkyl groups. In formula (V) above $R_2$ represents an alkylene having 3 carbon atoms, $R_2$ represents hydrogen or a C1-C3 alkyl group, n has a value of 0 to 40, m has a value of 0 to 40 and the sum of n+m is at least 2. When the above general formula represents a mixture, n and m will represent the average amount of the respective groups. Also, when the above formula represents a mixture, the indicated amount of carbon atoms in the aliphatic group $R_1$ may be an average number representing the average length of the hydrocarbon group in the surfactant mixture. Commercially available non-ionic surfactant or mixtures of non-ionic surfactants include those available from Clariant GmbH under the trade designation GENAPOL such as GENAPOL X-080 and GENAPOL PF 40. Further suitable non-ionic surfactants that are commercially available include those of the trade designation Tergitol TMN 6, Tergitol TMN 100X and Tergitol TMN 10 from Dow Chemical Company. Ethoxylated amines and amine oxides may also be used as emulsifiers.

Typical amounts are 1 to 12% by weight based on the weight of the dispersion. Further non fluorinated, non-ionic surfactants that can be used include alkoxylated acetylenic diols, for example ethoxylated acetylenic diols. The ethoxylated acetylenic diols for use in this embodiment preferably have a HLB between 11 and 16. Commercially available ethoxylated acetylenic diols that may be used include those available under the trade designation SURFYNOL from Air Products, Allentown, Pa. (for example, SURFYNOL 465). Still further useful non-ionic surfactants include polysiloxane based surfactants such as those available under the trade designation Silwet L77 (Crompton Corp., Middlebury, Conn.) Amine oxides are also considered useful as stabilizing additives to the fluoropolymer dispersions described herein.

Other examples of non-ionic surfactants include sugar surfactants, such as glycoside surfactants and the like.

Another class of non-ionic surfactants includes polysorbates. Polysorbates include ethoxylated, propoxylated or alkoxylated sorbitans and may further contain linear cyclic or branched alkyl residues, such as but not limited to fatty alcohol or fatty acid residues. Examples of polysorbates include those according to general structure:

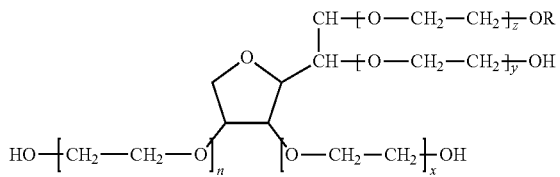

wherein R represents a residue OC—R1 and wherein R1 is a linear, branched, cyclic, saturated or unsaturated, preferably saturated, alkyl, alkoxy or polyoxy alkyl residue comprising 6 to 26, or 8 to 16 carbon atoms. In the above represented formula, n, x, y, and z are integers including 0 and n+x+y+z is from 3 to 12. The above general formula represents monoesters but di-, tri- or tetraester are also encompassed. In such case one or more of the hydroxyl hydrogens is replaced by a residue R, wherein the residue R has the same meaning as described above for the monoester.

Useful polysorbates include those available under the trade designation Polysorbate 20, Polysorbate 40, Polysorbate 60 and Polysorbate 80. Polysorbate 20, is a laurate ester of sorbitol and its anhydrides having approximately twenty moles of ethylene oxide for each mole of sorbitol and sorbitol anhydrides. Polysorbate 40 is a palmitate ester of sorbitol and its anhydrides having approximately twenty moles of ethylene oxide for each mole of sorbitol and sorbitol anhydrides. Polysorbate 60 is a mixture of stearate and palmitate esters of sorbitol and its anhydrides having approximately twenty moles of ethylene oxide for each mole of sorbitol and sorbitol anhydrides.

Polyelectrolytes, such as polyanionic compounds (for example polyanionic poly acrylates) may also be added to the dispersion in addition or instead of the surfactants described above.

The dispersions may further contain ingredients that may be beneficial when coating or impregnating the dispersion on a substrate, such as adhesion promoters, friction reducing agents, pigments and the like. Optional components include, for example, buffering agents and oxidizing agents as may be required or desired for the various applications. The dispersions of the present invention can be used to produce final coating compositions for coating various substrates such as metals, fluoropolymer layers and fabrics, such as, for example, glass fiber-based fabrics. Such fabrics may be used as architectural fabrics. Generally, the fluoropolymer dispersions will be blended with further components typically used to produce a final coating composition. Such further components may be dissolved or dispersed in an organic solvent such as toluene, xylene and the like. Typical components that are used in a final coating composition include polymers such as polyamide imides, polyimides or polyarylene sulphides or inorganic carbides, such as silicium carbide, and metal oxides. They are typically employed as heat resistant adhesion promoters or primers. Still further ingredients such as pigments and mica particles may be added as well to obtain the final coating composition. The fluoropolymer dispersions typically represent about 10 to 80% by weight of the final composition. Details on coating compositions for metal coatings and components used therein have been described in e.g. WO 02/78862, WO 94/14904, EP 1 016 466 A1, DE 2 714 593 A1, EP 0 329 154 A1, WO 0044576, and U.S. Pat. No. 3,489,595.

The fluoropolymer dispersions may be used, for example, to laminate, coat and/or impregnate a substrate. The substrate or the treated surface thereof may be an inorganic or organic material. The substrate may be, for example a fiber, a fabric, a granule or a layer. Typical substrates include organic or inorganic fibers, preferably glass fibers, organic or inorganic fabrics, granules (such as polymer beads) and layers containing one or more organic polymers, including, for example, fluoropolymers. The fabrics may be woven or non-woven fabrics. The substrate may also be a metal or an article containing a metal surface or a fluoropolymer surface or layer, such as but not limited to PTFE surface or layers.

The fluoropolymer dispersions may also be used to make "compounds". "Compounds" as use here are solid compositions comprising one or more fluoropolymers as described herein and one or more fillers and optionally further additives. Typically, "compounds" may be in the form of particles (like granules or pellets) or in the form of sheets. The "compounds" may have a diameter or longest axis of from at least 1 μm or at least 5 or at least 50 μm or at least 500 μm or at least 5,000 μm. For making "compounds" a homogeneous distribution of fluoropolymer and filler are desired. This however is often difficult to achieve by dry blending and extruding or blending during extrusion. In one embodiment a fluoropolymer dispersion as described above is used to make "compounds". In this embodiment a pH-dependent surfactant is added to the dispersion, at a pH at which the surfactant is in a form in which it stabilises the dispersion. The filler are then added to the dispersion and the mixture is shaken or stirred to provide a homogeneous distribution of the filler material in the dispersion. The fluoropolymer is then brought to coagulation, for example, by changing the pH to a level at which the pH-dependent surfactant no longer stabilises the dispersion. The coagulated fluoropolymer particles contain the filler material and homogeneous fluoropolymer compounds may be obtained. Suitable filler include carbon-based materials like for example soot, graphite, carbon blacks, carbon fibers, glass fibers, metals and metal alloys and the like. Instead of fillers additives may be incorporated into the compounds in the same way. Typically, fillers and or additives may be present in amounts of from 0.1 to up to 30% by weight based on the weight of the "compound".

pH-dependent surfactant are surfactants that exist in a ionic form at a certain pH level and in a non-ionic form at a different pH level. For example, a pH-dependent surfactant may be cationic at a pH below a pH of 6 or at 5 or at 4 and it may be non-ionic at a pH greater than 7 or 8 or 10 or 11. pH-dependent surfactants that may be used herein are described in detail for example in WO 2008/134138 to Dadalas et al which is incorporated herein by reference. pH-dependent surfactants include, for example, amine ethoxylates, for instance those provided under the trade designation GENAMIN from Clariant, Basel, Switzerland or TRITON RW from Dow Chemicals. Amine ethoxylates typically have a structure according to the general formula R1(R2)-N—R3.

In the above formula R1 and R2 represent independently from each other non-polar residues, like, for example, branched, linear or cyclic alkyl or oxoalkyl or polyoxyalkyl residues. R3 represents a polyoxylkylene residue such as a polyethoxylate or a polypropoxylate or a combination thereof.

For melt processing and making shaped articles the tetrafluoroethylene copolymers are used in dry form and therefore have to be separated from the dispersion. The tetrafluoroethylene copolymers described herein may be collected by deliberately coagulating them from the aqueous dispersions. In one embodiment, the aqueous emulsion is stirred at high shear rates to deliberately coagulate the polymers. In another embodiment, a coagulating agent, such as for example, an ammonium carbonate, a polyvalent organic salt, a mineral acid, a cationic emulsifier or an alcohol or a combination or a sequence thereof may be added to the aqueous emulsion to deliberately coagulate the polymers. Agglomerating agents such as hydrocarbons like toluenes, xylenes and the like may be added to increase the particle sizes and to form agglomerates. The use of agglomerating agents, in particular in the presence of mineral acids and while stirring lead to the formation of spherical particles.

Drying of the polymer particles obtained by the deliberate coagulation or by agglomeration can be carried out at an optional temperature, such as for example, drying within a range of from 100° C. to 300° C. The coagulated and dried polymers (i.e., secondary particles) according to the present disclosure have an average particle size (number average) of greater than 150, 250, 300, 400, 500, 1000, or even 1500 µm (micrometers). Particle sizes of coagulated particles can be determined by electron microscopy. The average particle sizes can be expressed as number average by standard particle size determination software. The particle sizes may be increased by melt-pelletizing.

The coagulated fluoropolymers or melt pellets may be subjected to a fluorination treatment as described, to remove thermally unstable end groups. Unstable end groups include —CONH2, —COF and —COOH groups. Fluorination is conducted so as to reduce the total number of those end groups to less than 100 per $10^6$ carbon atoms in the polymer backbone. Suitable fluorination methods are described for example in U.S. Pat. No. 4,743,658 or DE 195 47 909 A1. The amount of end groups can be determined by IR spectroscopy as described for example in EP 226 668 A1.

For making shaped articles the tetrafluoroethylene copolymers are brought to the melt (optionally after having been pelletized) and then processed from the melt to shaped articles, for example, by injection molding, blow molding, melt extruding, melt spinning and the like. Additives may be added before or during the melt processing. Such articles include, for example, fibers, films, O-rings, containers, tubes and the like. Typically, the additives may be present in amounts of 0%, greater than 0% and less than 50% by weight, or less than 20% by weight or less than 10% by weight so that the shaped article may be predominantly made from the tetrafluoroethylene copolymers.

Advantages and embodiments of this invention are further illustrated by the following list of embodiments and examples, but the particular materials and amounts thereof recited in these examples, as well as other conditions and details, should not be construed to unduly limit this invention. All parts and percentages are by weight unless otherwise indicated.

List of Specific Embodiments

1. A tetrafluoroethylene copolymer comprising repeating units derived from tetrafluoroethylene (TFE) and having a melting point of at least 317° C., a melt flow index (MFI) at 372° C. and a 5 kg load (MFI 372/5) of from about 0.60 g/10 min up to about 15 g/10 min, and comprising from 0.12 to 1.40% by weight based on the weight of the copolymer of units derived from one or more perfluorinated comonomers and wherein the perfluorinated comonomers comprise one or more perfluorinated alkyl vinyl ether or perfluorinated alkyl allyl ether wherein the alkyl group of the perfluorinated vinyl or allyl ether is interrupted by at least one oxygen atom.

2. The copolymer of 1 wherein the perfluorinated alkyl vinyl or alkyl allyl ether corresponds to the general formula

$$CF_2{=}CF{-}(CF_2)_n{-}O{-}Rf \qquad (I),$$

or

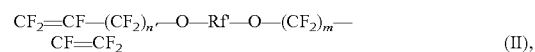

$$CF_2{=}CF{-}(CF_2)_{n'}{-}O{-}Rf'{-}O{-}(CF_2)_m{-}CF{=}CF_2 \qquad (II),$$

wherein n represents either 1 or 0,
n' and m represent, independently from each other either 1 or 0,
Rf represents a linear or branched, cyclic or acyclic perfluorinated alkyl residue containing at least one catenary oxygen atom and containing up to 8 carbon atoms, and
Rf' represents a linear, branched, cyclic or acyclic perfluorinated alkylene unit that may or may not contain one or more catenary oxygen atoms and that has up to 8 carbon atoms.

3. The copolymer of either one of 1 or 2 having an elongation at break of at least 10% or at least 20%.

4. The copolymer of any one of 1 to 3 having a tensile strength at break of at least 10 MPa.

5. The copolymer of any one of 1 to 4 having a melting point of at least 319° C. or at least 321° C.

6. The polymer of any one of 1 to 5 having a melting point between 321° C. and 329° C.

7. The copolymer of any one of 1 to 6 wherein the perfluorinated comonomer is selected from
$CF_2{=}CF{-}(CF_2)_n{-}O{-}Rf$ and wherein Rf represents a linear or branched perfluorinated alkyl residue containing one catenary oxygen and up to 6 carbon atoms.

8. The copolymer of any one of 1 to 6 wherein the perfluorinated comonomer is selected from
$CF_2{=}CF{-}(CF_2)_n{-}O{-}Rf$ and wherein Rf represents a linear or branched perfluorinated alkyl residue containing one catenary oxygen and up to 6 carbon atoms and wherein the copolymer has an MFI (372/5) between 0.60 and 5 g/10 min.

9. The copolymer of any one of 1 to 6 wherein the perfluorinated comonomer is selected from
$CF_2{=}CF{-}(CF_2)_n{-}O{-}Rf$ and wherein Rf represents a linear or branched perfluorinated alkyl residue containing one catenary oxygen and up to 6 carbon atoms, wherein the copolymer has an MFI (372/5) between 0.60 and 5 g/10 min and wherein the copolymer comprises from about 0.2 to about 1.4% by weight based on the weight of the copolymer, preferably from about 0.4 up to about 1.0% by weight based on the weight of the copolymer.

10. The copolymer according to any one of 1 to 6 wherein the perfluorinated comonomer is selected from $CF_2\!\!=\!\!CF\!\!-\!\!(CF_2)_n\!\!-\!\!O\!\!-\!\!Rf$ and wherein Rf represents a linear or branched perfluorinated alkyl residue containing at least two catenary oxygen atoms and up to 6 carbon atoms.

11. The copolymer according to any one of 1 to 6 wherein the perfluorinated comonomer is selected from $CF_2\!\!=\!\!CF\!\!-\!\!(CF_2)_n\!\!-\!\!O\!\!-\!\!Rf$ and wherein Rf represents a linear or branched perfluorinated alkyl residue containing at least two catenary oxygen atoms and up to 6 carbon atoms, wherein the copolymer has an MFI (372/5) between 0.8 and 12.0 g/10 min.

12. The copolymer according to any one of 1 to 6 wherein the perfluorinated comonomer is selected from $CF_2\!\!=\!\!CF\!\!-\!\!(CF_2)_n\!\!-\!\!O\!\!-\!\!Rf$ and wherein Rf represents a linear or branched perfluorinated alkyl residue containing at least two catenary oxygen atoms and up to 6 carbon atoms, wherein the amount of perfluorinated comonomer is from about 0.12% by weight to about 1.40 by weight, preferably from about 0.20 up to about 1.0% by weight, more preferably up to about 0.9% by weight based on the weight of the copolymer.

13. The copolymer according to 12 wherein the copolymer has an MFI (372/5) between 0.8 and 12.0 g/10 min.

14. The copolymer according to any one of 2 to 6 wherein the perfluorinated comonomer has the formula $CF_2\!\!=\!\!CF\!\!-\!\!(CF_2)_{n'}\!\!-\!\!O\!\!-\!\!Rf'\!\!-\!\!O\!\!-\!\!(CF_2)_m\!\!-\!\!CF\!\!=\!\!CF_2$.

15. The copolymer according to any one of 1 to 14 wherein the remainder of the copolymer is comprised of units derived from TFE.

16. The copolymer according to 15 wherein up to 30% by weight of the units derived from TFE are replaced by CTFE.

17. Method of making a shaped article comprising:
providing a composition comprising the copolymer according to any one of 1 to 16, subjecting the composition to melt-processing selected from melt extrusion, melt spinning, injection molding and melt blowing.

18. A shaped article comprising the polymer according to anyone of 1 to 16.

19. The shaped article of 18 being selected from fibers, films, O-rings, containers.

20. A composition comprising a copolymer according to any one of 1 to 16 wherein the composition is an aqueous dispersion.

21. Method of making tetrafluoroethylene copolymers that are melt-processable and have an elongation at break of at least 20% and a tensile strength at break of at least 10 MPa and a melting point of at least 317° C., or at least 319° C., or at least 321° C., and an MFI (375/5) of from 0.60 g/10 min up to about 15 g/10 min comprising:
polymerizing TFE in an aqueous medium in the presence of an effective amount of a perfluorinated comonomer as defined in claim 1.

22. The method of 21 comprising polymerising TFE in an aqueous emulsion polymerisation or suspension polymerisation in the presence of an initiator.

23. The method of 21 comprising polymerising TFE in an aqueous emulsion polymerisation in the presence of at least one initiator and at least one emulsifier.

24. The method of 21 to 23 wherein the effective amount comprises from 0.12 to 1.40% by weight based on the weight of TFE.

25. The method of any one of 21 to 24 wherein the perfluorinated alkyl vinyl or alkyl allyl ether corresponds to the general formula

$$CF_2\!\!=\!\!CF\!\!-\!\!(CF_2)_n\!\!-\!\!O\!\!-\!\!Rf \tag{I}$$

or

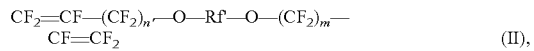

$$CF_2\!\!=\!\!CF\!\!-\!\!(CF_2)_{n'}\!\!-\!\!O\!\!-\!\!Rf'\!\!-\!\!O\!\!-\!\!(CF_2)_m\!\!-\!\!CF\!\!=\!\!CF_2 \tag{II}$$

wherein n represents either 1 or 0,
n' and m represent, independently from each other either 1 or 0,
Rf represents a linear or branched, cyclic or acyclic perfluorinated alkyl residue containing at least one catenary oxygen atom and containing up to 8 carbon atoms, and
Rf' represents a linear, branched, cyclic or acyclic perfluorinated alkylene unit that may or may not contain one or more catenary oxygen atoms and that has up to 8 carbon atoms.

26. The method of any one of 21 to 25 having a melting point of at least 319° C. or at least 321° C.

27. The method of any one of 21 to 26 having a melting point between 321° C. and 329° C.

28. The method of any one of 21 to 27 wherein the perfluorinated comonomer is selected from $CF_2\!\!=\!\!CF\!\!-\!\!(CF_2)_n\!\!-\!\!O\!\!-\!\!Rf$ and wherein Rf represents a linear or branched perfluorinated alkyl residue containing one catenary oxygen and up to 6 carbon atoms.

29. The method of any one of 21 to 28 wherein the perfluorinated comonomer is selected from $CF_2\!\!=\!\!CF\!\!-\!\!(CF_2)_n\!\!-\!\!O\!\!-\!\!Rf$ and wherein Rf represents a linear or branched perfluorinated alkyl residue containing one catenary oxygen and up to 6 carbon atoms and wherein the copolymer has an MFI (372/5) between 0.60 and 5 g/10 min.

30. The method of any one of 21 to 29 wherein the perfluorinated comonomer is selected from $CF_2\!\!=\!\!CF\!\!-\!\!(CF_2)_n\!\!-\!\!O\!\!-\!\!Rf$ and wherein Rf represents a linear or branched perfluorinated alkyl residue containing one catenary oxygen and up to 6 carbon atoms, wherein the copolymer has an MFI (372/5) between 0.60 and 5 g/10 min and wherein the effective amount comprises from at least about 0.2 to about 1.4% by weight based on the weight of TFE, preferably from at least about 0.4 up to about 1.0% by weight based on the weight of TFE.

31. The method according to any one of 21 to 27 wherein the perfluorinated comonomer is selected from $CF_2\!\!=\!\!CF\!\!-\!\!(CF_2)_n\!\!-\!\!O\!\!-\!\!Rf$ and wherein Rf represents a linear or branched perfluorinated alkyl residue containing at least two catenary oxygen atoms and up to 6 carbon atoms.

32. The method according to any one of 21 to 27 wherein the perfluorinated comonomer is selected from $CF_2\!\!=\!\!CF\!\!-\!\!(CF_2)_n\!\!-\!\!O\!\!-\!\!Rf$ and wherein Rf represents a linear or branched perfluorinated alkyl residue containing at least two catenary oxygen atoms and up to 6 carbon atoms, wherein the copolymer has an MFI (372/5) between 0.8 and 12.0 g/10 min.

33. The method according to any one of 21 to 27 wherein the perfluorinated comonomer is selected from $CF_2\!\!=\!\!CF\!\!-\!\!(CF_2)_n\!\!-\!\!O\!\!-\!\!Rf$ and wherein Rf represents a linear or branched perfluorinated alkyl residue containing at least two catenary oxygen atoms and up to 6 carbon atoms, wherein the effective amount of perfluorinated comonomer is from at least about 0.12% by weight to at least about 1.40 by weight, preferably from at least about 0.20 up to at least about 1.0% by weight based on the weight of TFE.

34. The method according to 33 wherein the copolymer has an MFI (372/5) between 0.8 and 12.0 g/10 min.
35. The method according to any one of 21 to 27 wherein the perfluorinated comonomer has the formula $CF_2=CF-(CF_2)_{n'}-O-Rf-O-(CF_2)_m-CF=CF_2$.
36. The method according to any one of 21 to 35 wherein the remainder of the monomers TFE.
37. The method according to 35 wherein up to 30% by weight of the TFE is replaced by CTFE.

Test Procedures:

Melt Flow Index (MFI):

Melt flow index was measured with a Göttfert melt indexer according to DIN EN ISO 1133 using a 5 kg load and a temperature of 372° C. (MFI 372/5). The extrusion time was one hour.

Average Particle Size:

Average particle size of polymer particles as polymerized was measured by electronic light scattering using a Malvern Autosizer 2c in accordance with ISO 13321. This method assumes a spherical particle size. The average particle sizes are expressed as the Z-average.

Solid Content:

The solid content (fluoropolymer content) of the dispersions was determined gravimetrically according to ISO 12086. A correction for non volatile inorganic salts was not carried out.

Comonomer Content:

The comonomer content in the polymers described herein was determined by infrared spectroscopy using a Thermo Nicolet Nexus FT-IR spectrometer. In the case of the MV-31 containing polymers the comonomer content in % wt was calculated as 1.48× the ratio of the sum of the 891 and the 997 $cm^{-1}$ absorbance to the 2365 $cm^{-1}$ absorbance. All other comonomer contents were calculated as 0.95× the ratio of the 993 $cm^{-1}$ absorbance to the 2365 $cm^{-1}$ absorbance (compare U.S. Pat. No. 6,395,848).

Melting Point:

Melting points were determined by DSC (a Perkin Elmer differential scanning calorimeter Pyris 1) according to ASTM D 4591. 5 mg samples were heated at a controlled rate of 10° C./min to a temperature of 380° C. by which the first melting temperature was recorded. The samples were then cooled at a rate of 10° C./min to a temperature of 300° C. and then reheated at 10° C./min to a temperature at 380° C. The melting point observed at the second heating period was recorded and is referred to herein as the melting point of the polymer (melting point of the once molten material).

Elongation at Break and Tensile Strength at Break:

Elongation at break and tensile strength at break were determined according to DIN EN ISO 527-1 using a Zwick Tensile Tester. Test specimen were elongated at a speed of 50 mm/min at room temperature (22° C.+/−3° C.).

Test samples were prepared as follows: dried polymer samples were given in a circular mold having a diameter of 130 mm and then press-molded at 360° C. and 53 bar for 2 minutes. The disks were removed from the mold and kept at 23° C. and 50% relative humidity for 16 hours. Test specimen (according to DIN ISO 12086) were cut from the disks and subjected to tensile tester.

Samples which broke when removing the disks from the molds or when cutting the test specimen from the disks could not be subjected to mechanical testing. Those samples were regarded to have a tensile strength and elongation at break of 0.

Comparative Example 1: Copolymer of TFE and PPVE

The reactor described in example 1 was filled with 30 liters deionized water and 190 g of a aqueous solution containing 30% by weight of the emulsifier $CF3-O-(CF2)3-O-CHF-CF2-COONH4$. After degassing the system the reactor was heated to 60° C. and ethane was introduced to reach 0.345 bar, followed by charging the reactor with 54 g PPVE-1. TFE was introduced until a pressure of 12 bar abs was reached. 6.0 g of ammonium peroxodisulfate (APS) dissolved in 50 ml water were introduced to initiate the polymerization. The pressure was kept constant by feeding TFE and additional PPVE-1 in a weight ratio of 1:0.010. When a total amount of 12 kg TFE was consumed the polymerization was stopped by closing the TFE feed. The reactor was vented and discharged. 41.8 kg of dispersion with a solids content of 29.7% were obtained.

The polymer had the following characteristics:
Particle size (in dispersion): 102 nm.
Melting point: 319° C.
MFI (372° C./5 kg): 6.4 g/10 min.
Comonomer content: 0.83 wt %.
Mechanical properties: elongation and tensile: 0*

* as used herein above and below means: testing was not possible because samples were too brittle. No specimen for measurement could be prepared.

Comparative Example 2: Copolymer of TFE and PPVE

Comparative Example 1 was repeated with the following changes: 6.0 g of initiator and 50 g of comonomer were charged. Ethane was added to give a pressure of 0.345 bar. A dispersion with a solid content of 29.4% was obtained.

The polymer had the following characteristics:
Particle size (dispersion): 99 nm.
Melting point: 323° C.
MFI (372° C./5 kg): 5.3 g/10 min.
Comonomer content: 0.53 wt %.
Elongation at break and Tensile strength at break: 0*

Comparative examples 1 and 2 show that a polymer having a melting point of greater than 317° C. can be prepared that can be melt-processed into a shaped article cannot be made by copolymerizing TFE with PPVE.

Example 1: Copolymer of TFE and MV-31

A 40 liter volume vertical stainless steel reactor equipped with an impeller stirrer working at 240 rpm was filled with 29 liters deionized water and 147 g of a 30 wt % solution of ammonium perfluoro 2,6-dioxa-nonanoic acid as emulsifier. After degassing the system the reactor was heated to 63° C. and ethane was introduced to reach a pressure of 0.26 bar, followed by charging the reaction with 72 g MV-31. TFE was introduced to the reactor until a pressure of 13 bar abs was reached. 1.3 g of the polymerization initiator ammonium peroxodisulfate (APS), dissolved in 50 ml water, were introduced to initiate the polymerization. The pressure was kept constant by feeding TFE and additional MV-31 in a weight ratio of 1:0.011. When a total amount of 12 kg TFE had been consumed the polymerization was stopped by closing the TFE feed. The reactor was vented and discharged. 42 kg of dispersion with a solids content of 29.2% were obtained. The polymer was isolated by coagulation with hydrochloric acid, agglomeration with gasoline, washing and drying in an oven.

The polymer had the following characteristics:
Particle size (of the dispersion): 115 nm.
Melting point: 322° C.
MFI (372° C./5 kg): 0.88 g/10 min.
Comonomer content: 0.62 wt %.
Elongation at break: 372%
Tensile strength at break: 23.6 MPa.

Example 2: Copolymer of TFE and MV-31

Example 1 was repeated with the following changes: 2.5 g of initiator and 258 g of comonomer were used. Ethane was added to give a pressure of 0.45 bar. A dispersion with a solid content of 29.1% was obtained.
The polymer had the following characteristics:
Particle size (of the dispersion): 121 nm.
Melting point: 325° C.
MFI (372° C./5 kg): 3.7 g/10 min.
Comonomer content: 0.66 wt %.
Elongation at break: 38%
Tensile strength at break: 13.9 MPa.

Comparative Example 3

The reaction described in example 1 was repeated with the following changes: The amount of comonomer was 311 g. Ethane was introduced into the reactor to reach a pressure of 0.6 bar. 4.0 g of initiator was used. A dispersion with a solid content of 29.2% was obtained.
The polymer had the following properties:
particle size: 120 nm,
MFI: 16.5,
comonomer content: 0.65% wt,
mp.: 321° C.
mechanical properties: elongation and tensile strength at break: 0*

A comparison of examples 1 and 2 with comparative examples 3 shows that an MFI (372/5) above 15 leads to brittle materials with no suitable mechanical properties.

Example 3: Copolymer of TFE and MA-21.111

The reactor described in example 1 was filled with 30 liters deionized water and 147 g of a 30 wt % solution of emulsifier. After degassing the system the reactor was heated to 85° C. and ethane was introduced to reach 0.100 bar, followed by charging the reactor with 168 g MA 21.111 as a 50% emulsion in water. TFE was introduced until a pressure of 13 bar abs was reached. 6.25 g of ammonium peroxodisulfate (APS) dissolved in 125 ml water were introduced to initiate the polymerization. During the polymerization additional 1.5 g/h APS were added as a 5% solution in deionised water. The pressure was kept constant by feeding TFE and additional 336 g MA 21.111 (as a 50% emulsion) in a weight ratio of 1:0.056. When a total amount of 12 kg TFE was consumed the polymerization was stopped by closing the TFE feed. The reactor was vented and discharged.
The polymer had the following characteristics:
particle size (dispersion): 148 nm,
melting point: 319° C.,
MFI: 3.6 g/10 min;
comonomer content: 0.14 wt %,
elongation at break: 295%,
tensile strength: 13.4 MPa.

Example 4: Copolymer of TFE and MA-211.111

The reactor described in example 1 was filled with 30 liters deionized water and 147 g of a 30 wt % solution of the emulsifier. After degassing the system the reactor was heated to 85° C. and ethane was introduced to reach 0.090 bar, followed by charging the reactor with 180 g MA 211.111 as a 50% emulsion in water. TFE was introduced until a pressure of 13 bar abs was reached. 6.20 g of ammonium peroxodisulfate (APS) dissolved in 125 ml water were introduced to initiate the polymerization. During the polymerization additional 1.6 g/h APS were added as a 4% solution in deionised water. The pressure was kept constant by feeding TFE and additional 368 g MA 211.111 (as an 50% wt. emulsion) in a weight ratio of 1:0.0613. When a total amount of 12 kg TFE was consumed the polymerization was stopped by closing the TFE feed. The reactor was vented and discharged.
The polymer had the following characteristics:
Particle size (dispersion): 154 nm.
Melting point: 319° C.
MFI 5.0 g/10 min;
Comonomer: 0.14 wt %,
Elongation at break: 130%,
Tensile strength: 13.5 MPa.

The invention claimed is:
1. A tetrafluoroethylene copolymer comprising repeating units derived from tetrafluoroethylene and from 0.12 to 1.40% by weight, based on the total weight of the copolymer, of units derived from a comonomer of the general formula:

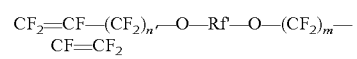

$$CF_2=CF-(CF_2)_{n'}-O-Rf-O-(CF_2)_{m}-CF=CF_2$$

wherein n' and m represent, independently from each other, either 1 or 0; and Rf' represents a linear, branched, cyclic or acyclic perfluorinated alkylene unit that may contain one or more ether oxygen atoms and that has up to 8 carbon atoms;
further wherein the copolymer has a melting point of at least 317° C., a melt flow index at 372° C. and a 5 kg load of from about 0.60 g/10 min up to about 15 g/10 min.
2. The copolymer of claim 1 having an elongation at break of at least 10%.
3. The copolymer of claim 1 having a tensile strength at break of at least 10 MPa.
4. The copolymer of claim 1 having a melting point of at least 319° C. or at least 321° C.
5. The copolymer according to claim 1, further comprising up to 30% by weight, based on the total weight of the copolymer, of units derived from chlorotrifluoroethylene.
6. A method of making a shaped article comprising:
providing a composition, the composition comprising a copolymer according to claim 1, and
subjecting the composition to melt-processing selected from melt extrusion, melt spinning, injection molding and melt blowing.
7. A shaped article comprising a copolymer according to claim 1.
8. A composition comprising an aqueous dispersion of a copolymer according to claim 1.

* * * * *